April 17, 1945.    W. DUBILIER    2,374,084
TERMINAL CONSTRUCTION
Original Filed Oct. 21, 1939
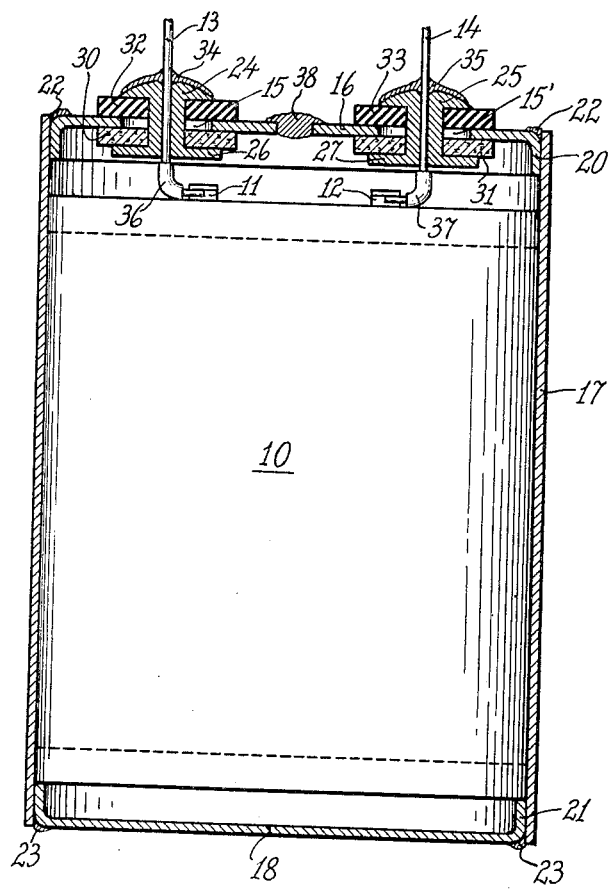
INVENTOR
William Dubilier
BY
ATTORNEY Patented Apr. 17, 1945

2,374,084

UNITED STATES PATENT OFFICE 2,374,084

TERMINAL CONSTRUCTION

William Dubilier, New Rochelle, N. Y., assignor to Cornell-Dubilier Electric Corporation, South Plainfield, N. J., a corporation of Delaware Original application October 21, 1939, Serial No. 300,522. Divided and this application May 21, 1941, Serial No. 394,447

2 Claims. (Cl. 174—153)

The present invention relates to electrical devices such as electrical capacitors and more particularly to a novel terminal construction for devices of this type which are enclosed within a metallic casing.

It is well known in the case of stacked or wound capacitors to provide a casing for enclosing a capacitor unit to protect it from moisture, air and other objectionable agents liable to impair its life and electrical efficiency. Similar casings for a like purpose are employed for other electrical devices such as transformers, circuit breakers and others.

In devices of the above type, difficulties have been experienced to provide a suitable electrical terminal and at the same time to ensure an efficient seal to protect the capacitor or other instrument from moisture and air or to prevent electrolyte or insulating liquid within the casing such as oil, wax, chlorinated diphenyl, etc., from leaking to the outside.

Accordingly, it is an object of this invention to provide a terminal construction for electrical capacitors or other electrical devices enclosed in a metallic casing which will ensure an efficient seal while at the same time being simple and easy to manufacture.

Another object is to provide a terminal construction which is characterized by great reliability and flexibility in maintaining an efficient seal during widely varying conditions of operaton such as extreme internal as well as external temperature changes to which the devices will be subjected.

These and further objects and advantages of the invention will become more apparent from the following description of a preferred embodiment thereof taken with reference to the accompanying drawing showing a cross-section through a terminal structure according to the invention embodied in an electrical capacitor.

In the drawing, there is shown a capacitor of the wound type comprising in a known manner metal foil electrodes such as strips of aluminum foil separated by insulating spacer strips such as of paper and wound into a convolute capacitor unit 10. As is understood, the unit may be of any other construction such as a stacked capacitor, the particular construction of the capacitor or other electrical instrument forming no part of the present invention. The electrodes are provided in a known manner with tabs 11 and 12 projecting from the unit and being connected to terminal wires or connectors 13 and 14, respectively, by soldering or in any other suitable manner. The connecting wires 13 and 14 are passed through holes 15 and 15' in the top wall or cover 16 of the metal casing housing the capacitor unit. The casing in the example shown comprises a side wall 17 and a bottom 18. The side wall 17 may consist of a metal strip bent into proper shape and having its ends over-lap and joined by soldering, seam-welding, or in any other suitable manner. The cover 16 is provided with a flange 20 and the bottom 18 is similarly provided with a flange 21. Both flanges are connected to the side wall 17 by solder joints 22 and 23, respectively, or alternatively by welding or in any other suitable manner to obtain a completely sealed casing for the capacitor. The latter fits snugly in the casing whereby the casing partly acts as a clamp to insure constant pressure on the capacitor unit and maintenance of a substantially constant capacity under various operating conditions.

The terminal connectors 13 and 14 advantageously consist of flexible wire elements which are passed through eyelets or rivets 24 and 25 having inner flanges 26 and 27 and mounted in the holes 15 and 15' by the aid of inner washers 30 and 31 and outer washers 32 and 33, respectively. The inner washers 30 and 31 are of suitable resilient material such as cork and firmly cemented to the flanges 26 and 27 of the eyelets 24 and 25 on the one hand and to the inner surface of the cover 16 on the other hand such as by previously dipping or impregnating the washers with a suitable insulating varnish, preferably a Bakelite varnish. The outer washers 32 and 33 may be of the same material or of relatively stiff insulating material such as Bakelite or any other artificial resin. The entire assembly is firmly held by forcing the heads of the eyelets or rivets 24 and 25 against the flanges 26 and 27 whereby the latter will be partly pressed into the washers 30 and 31 resulting in the establishment of a liquid and air tight and mechanically efficient seal and terminal construction. The heads of the rivets are advantageously covered with a layer of solder 34 and 35 to effect a solid and tight joint for the wires or connectors 13 and 14. Sleeves of insulating material 36 and 37 are advantageously placed over the connecting wires between the rivets and the capacitor units. The capacitor may be impregnated and treated in any known manner by providing an opening which is then closed by solder as shown at 38 as is readily understood by those skilled in the art.

A terminal construction of the aforedescribed type has been found to provide a tight and efficient seal under widely varied operating conditions due to the flexible and bellows-like connection of the eyelets 24 and 25 to the casing by way of the cork washers 30 and 31 or washers of equivalent yielding or flexible material. These washers are cemented or firmly bonded to the eyelets on the one hand and to the casing on the other hand by the varnish joint, whereby expansion and contraction of the metal parts due to heat or temperature changes will not destroy the joints but cause the cork or equivalent material to expand or contract like a bellows, thus providing a floating or flexible structure which insures a tight and efficient seal under practically any temperature to which the capacitor or other electrical instrument may be subjected. It will be understood that in order to obtain this effect the only connection between the eyelets and the inside of the casing is by way of the resilient washers 30 and 31. Thus, if a stiff washer were used for this purpose, cracks would occur in the joints due to expansion and contraction, resulting in impairment of the joint and the establishment of leaks between the inside to the outside of the casing.

It will be evident from the foregoing that the invention is not limited to the specific construction and arrangement of parts shown and disclosed herein for illustration, but that the underlying principle will be susceptible of variations and modifications coming within the broader scope of the invention as defined by the appended claims. The specification and drawing are accordingly to be regarded in an illustrative rather than in a limited sense.

This application is a division of application Serial No. 300,522, filed October 21, 1939.

I claim:

1. A terminal construction for electrical devices mounted in a metal casing comprising a hollow tubular rivet passing through an opening in a wall of said casing, said rivet being insulated from said casing by an intervening air space therebetween and the edge of said opening, an inner annular flange on said rivet spanning said opening, an inner flexible annular insulating washer of greater peripheral diameter than said opening interposed between said flange and the inside of said casing, an outer relatively rigid annular insulating washer encircling said rivet and engaging the outside of said casing adjacent to said opening, the projecting end of said rivet being deformed outwardly and forced against said outer washer, whereby to clamp said inner washer against said casing, a terminal lead liquid-tightly connected to and passing through said rivet from the inside to the outside of said casing, said inner washer having one face cemented to said flange and having its opposite face cemented to said casing, whereby to allow of contraction of said rivet and casing due to temperature changes without affecting the cementing joints therebetween and said inner washer.

2. A terminal construction for electrical devices mounted in a metal casing comprising a hollow tubular rivet passing through an opening in a wall of said casing with the shank of the rivet spaced from the edges of said opening to be insulated therefrom and having an inner annular integral flange spanning said opening, an inner annular flexible washer between said flange and the inside of the casing positioned around the shank of the rivet and having its annular portion extending from said shank to a diameter greater than the diameter of said flange, cementing means sealing said flexible washer to said casing and flange, and means at the outer end of said rivet including an integral head flange and an underlying washer exerting an outward pull on the rivet to partly press said inner flange into said inner flexible washer and maintain a fluid-tight seal secure against loosening under temperature changes, and a terminal lead passing through said rivet and having a liquid-tight connection sealing the bore of said rivet.

WILLIAM DUBILIER.